United States Patent [19]
Heinitz et al.

[11] Patent Number: 6,125,829
[45] Date of Patent: Oct. 3, 2000

[54] METHOD OF CONTROLLING EXHAUST GAS RECIRCULATION IN AN INTERNAL COMBUSTION ENGINE

[75] Inventors: Dirk Heinitz, Schoenhofen; Achim Przymusinski, Regensburg; Christian Birkner, Irlbach, all of Germany

[73] Assignee: Siemens Aktiengesellschaft, Munich, Germany

[21] Appl. No.: 09/162,858

[22] Filed: Sep. 29, 1998

[30] Foreign Application Priority Data

Sep. 29, 1997 [DE] Germany ............... 197 42 987

[51] Int. Cl.⁷ ............... F02D 41/04; F02M 25/07
[52] U.S. Cl. ............... 123/568.21
[58] Field of Search ............... 123/568.21; 701/108

[56] References Cited

U.S. PATENT DOCUMENTS

| | | | |
|---|---|---|---|
| 3,628,116 | 12/1971 | Preikschat | 318/590 |
| 5,520,159 | 5/1996 | Pao et al. | 123/568.27 |
| 5,533,489 | 7/1996 | Socci et al. | 123/568.21 |
| 5,682,864 | 11/1997 | Shirakawa | 123/568.21 |

FOREIGN PATENT DOCUMENTS

| | | |
|---|---|---|
| 195 02 368 A1 | 8/1996 | Germany . |
| 195 35 056 C1 | 10/1996 | Germany . |
| 42 22 414 C2 | 5/1997 | Germany . |

OTHER PUBLICATIONS

Dubbel, pocket book for mechanical engineering (Beitz et al.).

Primary Examiner—Andrew M. Dolinar
Attorney, Agent, or Firm—Herbert L. Lerner; Laurence A. Greenberg; Werner H. Stemer

[57] ABSTRACT

A method of controlling the exhaust gas recirculation in an internal combustion engine. The operation is improved in the non-steady operating state of the engine by correcting the setpoint value of the exhaust gas recirculation rate for the non-steady operating state.

7 Claims, 3 Drawing Sheets

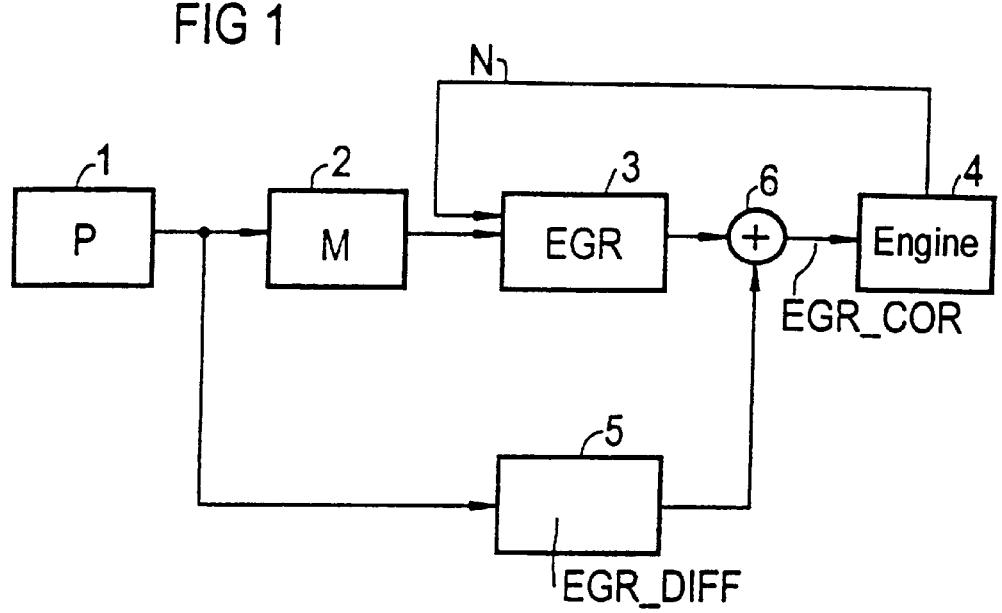
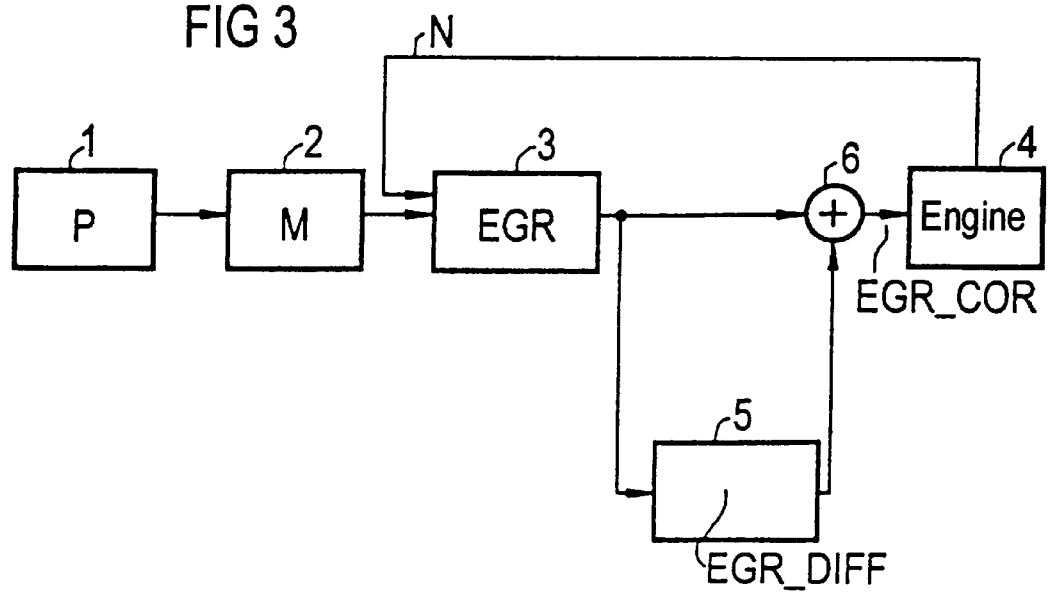

FIG 2
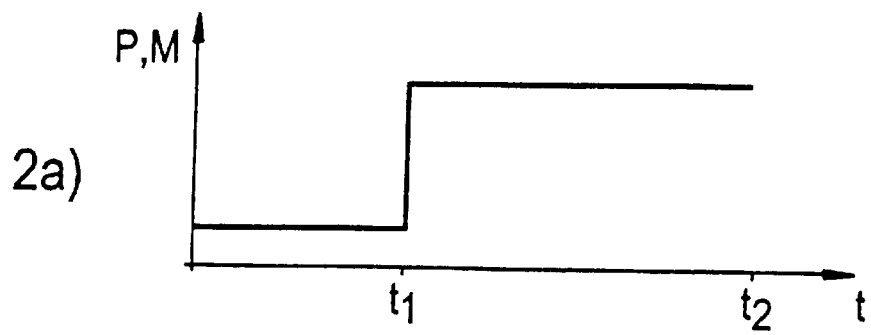
2a)
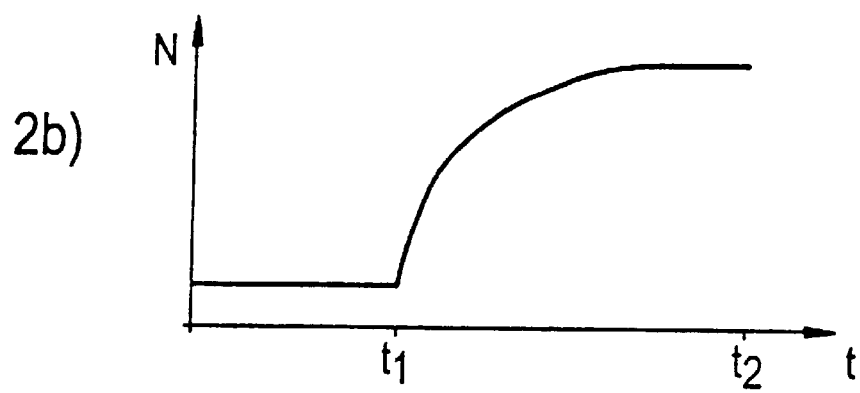
2b)
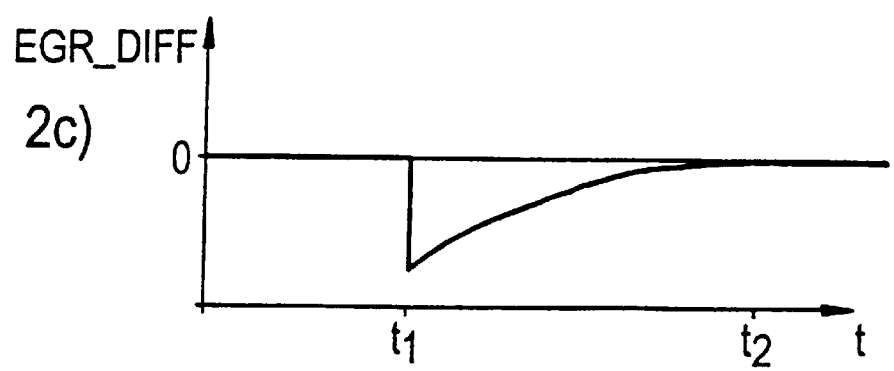
2c)
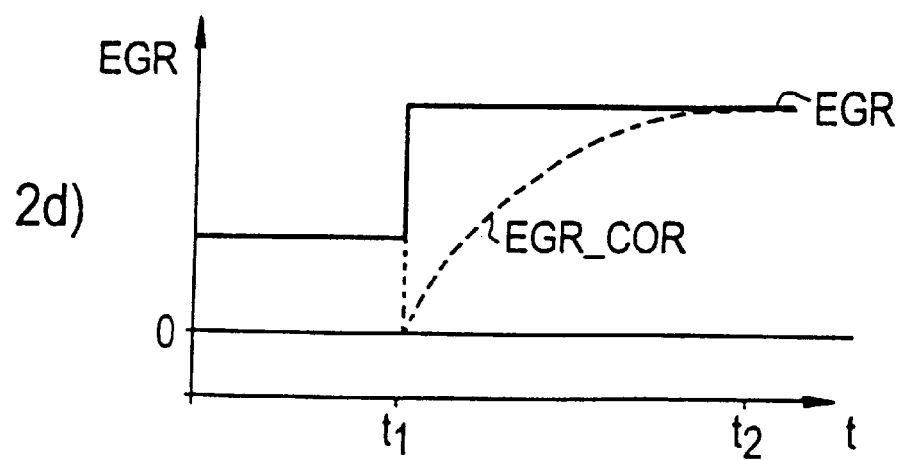
2d)

METHOD OF CONTROLLING EXHAUST GAS RECIRCULATION IN AN INTERNAL COMBUSTION ENGINE

BACKGROUND OF THE INVENTION

Field of the Invention

The invention lies in the field of internal combustion engines. More specifically, the invention relates to a method of controlling the exhaust gas recirculation in an internal combustion engine in which, dependent on a load variable and other input variables, in particular the engine speed, a setpoint value, stored in memory in a control unit of the exhaust gas recirculation rate is ascertained and a control signal for controlling an exhaust gas recirculation valve is derived from the setpoint value for the exhaust gas recirculation rate. The setpoint value stored in the control unit is appropriate for steady-state operation of the engine.

In internal combustion engines, especially diesel engines, exhaust gas recirculation is employed to reduce the proportion of $NO_x$ in the exhaust gas. From a technical combustion standpoint, it is necessary to furnish defined exhaust gas recirculation rates over the entire engine operating range. The exhaust gas recirculation rate is dependent on the difference between the charge-air-pressure in the intake pipe and the exhaust gas back pressure, as well as on the setting of an exhaust gas recirculation valve that is located in a connection between the exhaust gas system and the intake conduit. German published patent application DE 195 02 368 A1 describes a method for determining the actual recirculation rate.

To assure a defined exhaust gas recirculation rate, open-or closed-loop control devices are known. For instance, German Patent DE 42 22 414 C2 describes an exhaust gas recirculation control device for an internal combustion engine. As a rule, controlling the exhaust gas recirculation is done by a control unit, which in dependence on input variables such as the intake pressure, accelerator pedal position, and engine speed determines a requisite exhaust gas recirculation information, in particular the exhaust gas recirculation rate, for operating the engine. This is conventionally done by storing setpoint values in a performance graph for various input variables. These setpoint values are ascertained with the aid of static tests performed on a test bench. The performance graph applies to steady-state engine operating phases.

For a non-steady operating state, that is, upon transitions from one steady operating state to another, performance graph specification of setpoint values is not always satisfactory, particularly with regard to the emission behavior and fuel consumption. Upon a rapid load change, such as starting up, the setpoint value rises, passing through points of the performance graph in which a higher exhaust gas recirculation rate is desired under steady-state conditions. On starting or during acceleration, however, because of the sharp rise in the fuel quantity, air deficiency phenomena occur, since the pressure, present in the steady state, in the intake system is unavailable, or not yet available, in this non-steady operating phase. The consequence of this in diesel engines is increased soot. An additionally increased exhaust gas recirculation rate reduces the oxygen content in the supplied air and thus exacerbates the problem. The closed-loop control of the EGR rate has therefore until now been turned off during idling or upon acceleration. It is difficult to define the conditions for turning the closed-loop control on and off.

SUMMARY OF THE INVENTION

It is accordingly an object of the invention to provide a method of controlling the exhaust gas recirculation in an internal combustion engine, which overcomes the above-mentioned disadvantages of the heretofore-known devices and methods of this general type and which is also suitable for non-steady operating phases.

With the foregoing and other objects in view there is provided, in accordance with the invention, a method of controlling the exhaust gas recirculation in an internal combustion engine having an exhaust gas recirculation valve, the method which comprises:

storing in a memory of a control unit setpoint values for an exhaust gas recirculation rate appropriate for steady-state operation of an internal combustion engine;

determining a setpoint value for an exhaust gas recirculation rate from the memory as a function of a load variable and other input variables, specifically the engine speed;

deriving a control signal for controlling an exhaust gas recirculation valve from the setpoint value for the exhaust gas recirculation rate;

generating a correction value in a correction element in non-steady operating states of the engine; and correcting the setpoint value of the exhaust gas recirculation rate with the correction value to form a corrected setpoint value appropriate for an exhaust gas recirculation in non-steady operating states of the engine.

In other words, the objects of the invention are satisfied in that the setpoint values for the exhaust gas recirculation rate for non-steady engine operating states, taken from a performance graph, are corrected by the initial value of the correction element. By suitably selecting the correction element and suitably setting its time constant, the requisite correction behavior and thus improved engine performance data are attained.

In accordance with an added feature of the invention, a transfer member with a differentiator component is used as the correction element, and the correction value is ascertained as a function of the load variable or of the setpoint value of the exhaust gas recirculation rate.

In accordance with an additional feature of the invention, the load variable is a signal output by a transducer at an accelerator pedal, and the correction element is supplied with the signal output by the transducer as the load variable.

In accordance with another feature of the invention, the correction element is supplied with a signal corresponding to a fuel quantity to be injected as the load variable.

In accordance with again another feature of the invention, the correction value and the setpoint value of the exhaust gas recirculation rate are additively combined.

In accordance with a concomitant feature of the invention, the transfer member is a DT1 member, a DT2 member, a PDT1 member, or a PDT2 member.

Other features which are considered as characteristic for the invention are set forth in the appended claims.

Although the invention is illustrated and described herein as embodied in method for controlling exhaust gas recirculation in an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram illustrating the method of the invention for controlling exhaust gas recirculation;

FIG. 2 is a time chart illustrating the course over time of various variables, namely:

FIG. 2a, an injected fuel quantity M,

FIG. 2b, an engine speed N (rpm),

FIG. 2c, a correction value EGR_DIFF, and

FIG. 2d, an exhaust gas recirculation EGR or EGR_COR;

FIG. 3 is a block diagram illustrating another embodiment of the method of the invention.

DESCRIPTION OF THE PREFERRED EMBODIMENTS

Figure 4:
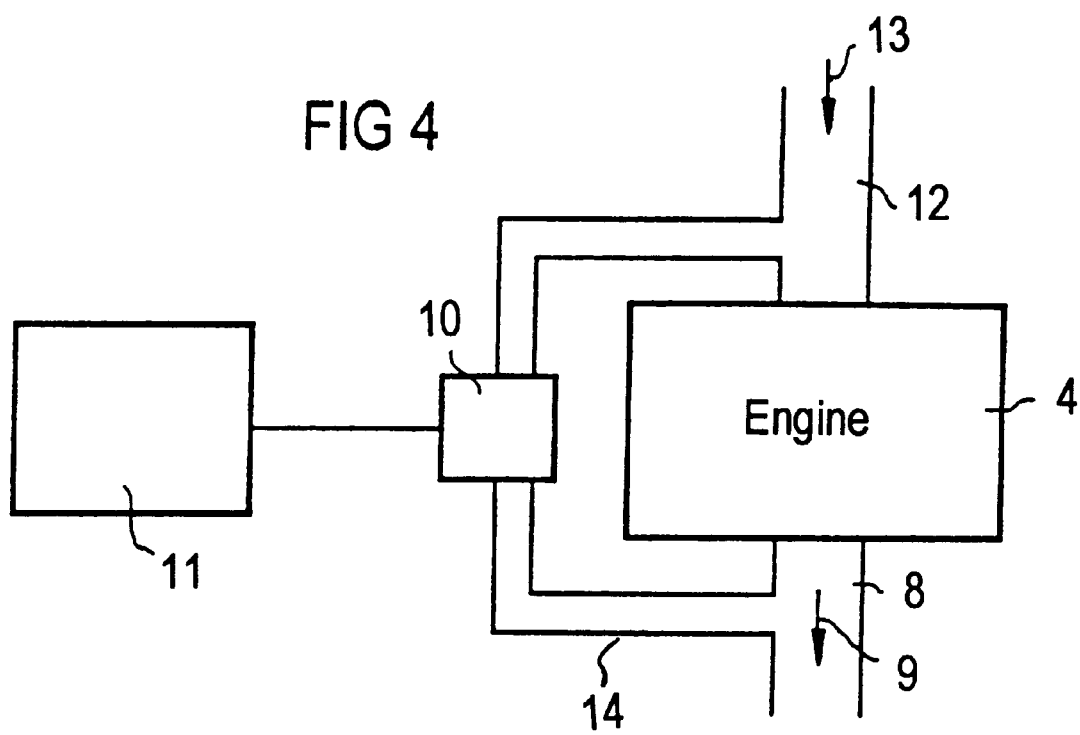
FIG. 4 is a schematic illustration of an exhaust gas recirculation system.

Referring now to the figures of the drawing in detail and first, particularly, to FIG. 4 thereof, there is seen a generalized illustration of an exhaust gas recirculation for an internal combustion engine 4. Some of the exhaust gas leaving the engine 4 in the direction of an arrow 9, is drawn from the exhaust line 8 and recirculated through a recirculation line 14 to the fuel-air mixture. The fuel-air mixture flows in the direction of an arrow 13 in an intake pipe 12. An exhaust gas recirculation valve 10 is placed in the recirculation line 14. The valve 10 is driven by a control unit 11. Since the recirculated exhaust gas components can no longer participate in the combustion, the combustion temperature is reduced, and less nitrogen oxide is generated.

Referring now to FIG. 1, there is shown a preferred mode of the method of the invention for controlling exhaust gas recirculation in an internal combustion engine. A load variable is expressed by the signal P of a transducer 1 at the accelerator pedal and is delivered to a performance graph 2 (characteristic map). There, the signal P is used for determining a fuel quantity M to be injected. The load variable may also be the fuel quantity M, the engine torque, the air flow rate, or the intake pressure. The fuel quantity M is supplied to a performance graph 3. This performance graph 3 is also supplied with the actual value for the speed N of the engine 4, as a further input variable. From the values N and M, the performance graph 3 determines the setpoint value for the exhaust gas recirculation rate EGR. The setpoint values of the exhaust gas recirculation rates EGR stored in the performance graph 3 were determined under steady-state conditions and are thus valid for steady operating states of the engine 4. From the setpoint value EGR, a control signal for triggering the exhaust gas recirculation valve 10 in FIG. 4 is derived.

For non-steady engine operating states, that is, for changes in the load variable or speed, the setpoint values EGR stored in the performance graph 3 are not optimal with regard to such criteria as engine smoothness, fuel consumption, or emission behavior.

To obtain exhaust gas recirculation rates that fit non-steady operating states, according to the invention a correction element 5 is provided. The correction element 5 receives the signal P of the transducer 1, that is, the load variable, as its input variable. The correction element 5 executes a mathematical operation on the basis of the load variable. The mathematical operation may for instance be a delayed differentiation (DT1 member). The correction element 5 determines a correction value EGR_DIFF. From it, together with the setpoint value output by the performance graph 3 for the exhaust gas recirculation rate EGR for the non-steady state of the engine 4, corrected exhaust gas recirculation rates EGR_COR are formed in an adder stage 6; they improve engine smoothness, fuel consumption or emission behavior in particular in the non-steady operating state of the engine 4.

Referring now to FIG. 2, there is shown the time behavior of various variables. The time is plotted on the abcissa (x-axis) and the corresponding variables, namely the fuel quantity M in FIG. 2a, the engine speed N (rpm) in FIG. 2b, the correction value EGR_DIFF in FIG. 2c, and the exhaust gas recirculation rate EGR or EGR_COR in FIG. 2d, are plotted on the ordinate (y-axis). At time $t_3$, the driver seeks to increase the speed (rpm). The load variable corresponding to the driver's wish jumps suddenly to a higher value, and hence the fuel quantity M determined by the performance graph 2 does the same. Up to this time, the exhaust gas recirculation of the engine was effected on the basis of the exhaust gas recirculation rate EGR. The correction value EGR_DIFF furnished by the correction element 5 was zero, since the load variable was constant and a steady operating state thus prevailed. With the sudden change in the load variable, a non-steady operating state ensues. The exhaust gas recirculation rate EGR that was optimal for the steady state is corrected using the value EGR_DIFF furnished by the correction element 5, so that the corrected exhaust gas recirculation rate EGR_COR, which is valid for the non-steady operating state, is obtained. The behavior of the correction element and thus the course of the correction value EGR_DIFF can be determined by a suitable choice of correction element 5. The correction element has a transfer member, with a differentiator component with suitable time constants.

Elements that can be considered as transfer members are the following:

DT1: differential member with one time constant;

DT2: differential member with two time constants;

PDT1: proportional differential member with one time constant;

PDT2: proportional differential member with two time constants;

as well as modifications thereof, especially asymmetrical ones, that is, those that react only to a positive or negative change in the input variable.

The differentiating behavior of a transfer member is characterized in that its output signal, after all the transitional events have faded, is proportional to the derivative with respect to time of the input signal. A transfer member has P behavior (proportional behavior) if in the steady state the output variable depends linearly on the input variable. The PDT and DT transfer members described moreover, also have one or two time constants, by way of which the timing with which the transfer member reacts to a change in the input variable can be adjusted. Depending on how this timing is adjusted, it takes a variable length of time after the jump from an input variable to a new constant value until the correction value EGR_DIFF has come to be zero again, and the corrected exhaust gas recirculation rate EGR_COR again corresponds to the setpoint value EGR, furnished by the performance graph 3, for the steady operating state. After time $t_2$, a steady operating state is again reached; the rpm N has risen and remains constant. The correction value EGR_

COR has returned to zero, and the engine is operated with which exhaust gas recirculation rate EGR specified for this steady operating state.

Referring now to FIG. 3, there is shown an alternative embodiment of the method of the invention for controlling the exhaust gas recirculation of an internal combustion engine 4. The elements designated by reference numerals 1, 2, 3, 4 and 5 are equivalent to those of FIG. 1. Analogously to the procedure described in conjunction with FIG. 1, a setpoint value for the exhaust gas recirculation rate EGR that is optimal for steady operating states of the engine 4 is ascertained from the performance graph 3. For adaptation to non-steady operating states, a correction value EGR_DIFF is determined by the correction element 5. Unlike the exemplary embodiment of FIG. 1, however, it is not the load variable that is used as the input variable of the correction element 5, but rather the setpoint value, ascertained for the steady state, of the exhaust gas recirculation rate EGR.

We claim:

1. A method of controlling the exhaust gas recirculation in an internal combustion engine having an exhaust gas recirculation valve, the method which comprises:

storing in a memory of a control unit setpoint values for an exhaust gas recirculation rate appropriate for steady-state operation of an internal combustion engine;

determining a setpoint value for an exhaust gas recirculation rate from the memory as a function of a load variable and engine speed;

deriving a control signal for controlling an exhaust gas recirculation valve from the setpoint value for the exhaust gas recirculation rate;

generating in non-steady operating states of the engine a correction value in a correction element;

using a transfer member with a differentiator component as the correction element, and ascertaining the correction value as a function of the load variable or of the setpoint value of the exhaust gas recirculation rate; and correcting the setpoint value of the exhaust gas recirculation rate with the correction value to form a corrected setpoint value appropriate for an exhaust gas recirculation in non-steady operating states of the engine by additively combining the correction value and the setpoint value of the exhaust gas recirculation rate.

2. The method according to claim 1, wherein the load variable is a signal output by a transducer at an accelerator pedal, and which comprises supplying to the correction element the signal output by the transducer as the load variable.

3. The method according to claim 1, which comprises supplying to the correction element a signal corresponding to a fuel quantity to be injected as the load variable.

4. The method according to claim 1, wherein the transfer member is a DT1 member.

5. The method according to claim 1, wherein the transfer member is a DT2 member.

6. The method according to claim 1, wherein the transfer member is a PDT1 member.

7. The method according to claim 1, wherein the transfer member is a PDT2 member.

* * * * *